(12) United States Patent
Cai et al.

(10) Patent No.: US 8,924,491 B2
(45) Date of Patent: Dec. 30, 2014

(54) TRACKING MESSAGE TOPICS IN AN INTERACTIVE MESSAGING ENVIRONMENT

(75) Inventors: Keke Cai, Beijing (CN); HongLei Guo, Beijing (CN); Zhong Su, Beijing (CN); Hui Jia Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 13/403,472

(22) Filed: Feb. 23, 2012

(65) Prior Publication Data

US 2012/0221656 A1   Aug. 30, 2012

(30) Foreign Application Priority Data

Feb. 28, 2011   (CN) .......................... 2011 1 0047636

(51) Int. Cl.
*G06F 15/16* (2006.01)
*H04L 12/58* (2006.01)

(52) U.S. Cl.
CPC ............. *H04L 12/586* (2013.01); *H04L 12/588* (2013.01); *H04L 51/16* (2013.01)
USPC ........... 709/206; 715/784; 707/722; 705/319; 705/7.31

(58) Field of Classification Search
CPC ..... H04L 63/123; H04L 69/22; H04L 12/586; H04L 12/587; H04L 12/5875; H04L 51/24; H04M 1/72552
See application file for complete search history.

(56) References Cited

U.S. PATENT DOCUMENTS

| | | | |
|---|---|---|---|
| 7,310,658 B2 | 12/2007 | Giles et al. | |
| 2003/0140309 A1* | 7/2003 | Saito et al. | 715/500 |
| 2006/0294191 A1 | 12/2006 | Marston et al. | |
| 2009/0157830 A1* | 6/2009 | Kim | 709/206 |
| 2009/0186635 A1* | 7/2009 | Vieri | 455/466 |
| 2009/0217125 A1* | 8/2009 | Liu | 714/752 |
| 2010/0042944 A1 | 2/2010 | Robinson et al. | |
| 2010/0169327 A1 | 7/2010 | Lindsay et al. | |
| 2010/0235235 A1 | 9/2010 | Hosseini et al. | |
| 2010/0235758 A1 | 9/2010 | Shen | |
| 2011/0145348 A1* | 6/2011 | Benyamin et al. | 709/206 |
| 2012/0053990 A1* | 3/2012 | Pereg et al. | 705/7.31 |
| 2012/0185797 A1* | 7/2012 | Thorsen et al. | 715/784 |
| 2012/0210334 A1* | 8/2012 | Sutedja et al. | 719/314 |

OTHER PUBLICATIONS

Cindy Xide Lin, ". PET: A Statistical Model . . . Communities", Source: KDD '10 Proceedings of 16th ACM SIGKDD international conference on Knowledge discovery and data mining.

* cited by examiner

*Primary Examiner* — Dustin Nguyen
*Assistant Examiner* — Hao Nguyen
(74) *Attorney, Agent, or Firm* — Cantor Colburn LLP

(57) ABSTRACT

A method and apparatus for tracking a topic involved in a message in an interactive messaging environment containing a plurality of messages by combining with context messages associated with the message. The method includes the steps of: selecting a message from the plurality of messages contained in the interactive messaging environment; identifying context messages associated with the selected message from the plurality of messages contained in the interactive messaging environment; and grouping the selected message into one or more topic groups based on the identified context messages. The topic tracking method and apparatus of the invention can accurately determine similarities between messages in an interactive messaging environment such as microblog to perform topic tracking.

12 Claims, 9 Drawing Sheets

TRACKING MESSAGE TOPICS IN AN INTERACTIVE MESSAGING ENVIRONMENT

CROSS REFERENCE TO RELATED APPLICATION

The present invention claims priority under 35 U.S.C. 119 from Chinese Application 201110047636.8, filed Feb. 28, 2011, the entire contents of which are incorporated herein by reference.

BACKGROUND OF THE INVENTION

1. Field of the Invention

The present invention generally relates to information processing in an interactive messaging environment, and more specifically to a topic tracking method and apparatus in an interactive messaging environment.

2. Description of Related Art

In recent years, a web-based micro social behavior application platform such as microblog, as a completely new interactive messaging environment, obtains surprising and rapid developments thanking to its convenience, grass roots support, simplicity and ease-of-use. According to statistics, up to 2010, users registered with twitter in the world have reached 75,000,000.

FIG. 10 presents an example of interactions on microblog. The user may act as a microblogger to freely issue messages of any topics on his microblog, and may also act as a fan to remark on messages issued by other users on other user's microblog.

Different from traditional web 2.0 applications, a length of message issued on the microblog is limited, for example, twitter defines at most 140 characters. Therefore, in the microblog, people use concise messages to describe a kernel part of their idea, where a lot of context information is ignored. Therefore, to better understand the meanings of the interested messages, fans have to go through the previous messages one by one.

However, it is not an easy task to find out all the wanted messages from hundreds of messages, because, on the one hand, topics have some kind of continuity over time, and on the other hand, people's behaviors on the web are discontinuous. Distributed topic context messages on the microblog make it difficult for fans to track history of a certain topic. There is a need for an efficient topic tracking method to solve this problem.

Most traditional topic tracking methods heavily depend on content similarity by directly comparing contents of the messages to identify topics of the messages. However, such traditional methods cannot be well applied to an interactive messaging environment, such as microblog, where the length of messages is limited. As shown in FIG. 10A, a microblogger named "wakenheart" firstly issues a microblog message A: "Australia is very beautiful and is as good as heaven", and issues, after a period of time, another message B: "Today I hold a Koala in my arms, it is quiet, and how lovely it is". When the contents of the two messages are directly compared with each other according to the traditional methods, since the contents of the two messages seem to have no repetitions and poor similarity, it is hard to associate the two messages with each other.

SUMMARY OF THE INVENTION

According to a first aspect of the invention, a method of tracking message topics in an interactive messaging environment is provided, wherein the interactive messaging environment contains a plurality of messages, the method including the steps of: selecting a message from the plurality of messages contained in the interactive messaging environment; identifying context messages associated with the selected message from the plurality of messages contained in the interactive messaging environment; and grouping the selected message into one or more topic groups based on the identified context messages.

According to a second aspect of the invention, an apparatus for tracking message topics in an interactive messaging environment is provided, wherein the interactive messaging environment contains a plurality of messages, the apparatus including: message selecting means configured to select a message from the plurality of messages contained in the interactive messaging environment; context message identifying means configured to identify context messages associated with the message selected by the message selecting means from the plurality of messages contained in the interactive messaging environment; and grouping means configured to group the message selected by the message selecting means into one or more topic groups based on the context messages identified by the context message identifying means.

BRIEF DESCRIPTION OF THE DRAWINGS

The drawings referenced in the present application are only used to exemplify typical embodiments of the present invention and should not be considered to be limiting the scope of the present invention.

DETAILED DESCRIPTION OF THE PREFERRED EMBODIMENT

As compared with the prior art, the topic tracking method and apparatus of the invention can accurately identify similarity between a plurality of messages even in an interactive messaging environment, such as microblog, where the length of messages is limited.

In the microblog, a microblog message issued by the microblogger may have one or more following messages. For example, fans can perform interactive operations such as replying to, forwarding or the like on the microblog message. In general, followers will make remarks when replying to or forwarding the microblog message, and these remarks provide useful context information for the microblog message.

The topic tracking method and apparatus according to embodiments of the invention can construct a context associated with the microblog message by using the remarks made by the followers when replying to or forwarding the mibroblog message, expand kernel topic keywords extracted from the associated microblog messages per se by using context topic keywords extracted from the context, to obtain expanded topic keywords; and then compare similarity between the microblog messages by using the expanded topic keywords, thereby more accurately performing topic tracking between the microblog messages.

Figure 10A:
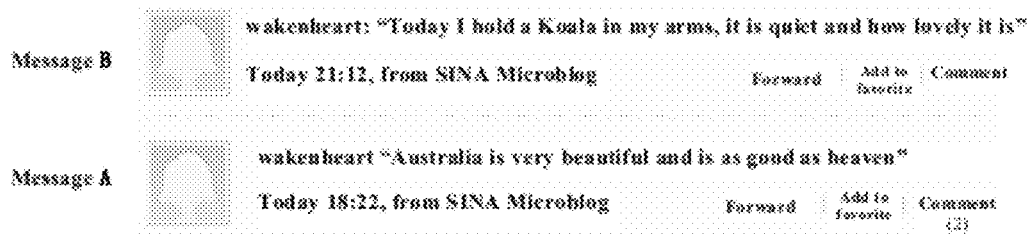
FIG. 10A is a schematic diagram showing examples of interactions on microblog.
Figure 10B:
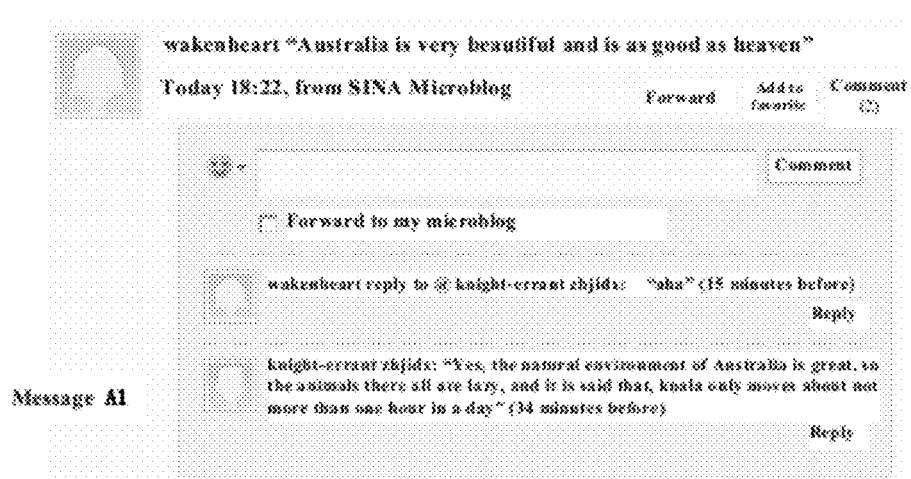
FIG. 10B is a schematic diagram showing further examples of interactions on microblog.

In the example shown in FIG. 10A, solely analyzing the microblog message A and the microblog message B cannot correlate the two messages with each other. If, as shown in FIG. 10B, a fan "knight-errant zhjidx" says, in a reply message A1 to the first microblog message A, "Yes, the natural environment of Australia is great, so the animals there all are lazy, and it is said that, koala only moves about not more than one hour in a day". According to an embodiment of the invention, "koala" in the reply message A1 may be extracted as a context topic keyword, thereby a correlation between the message A and the message B is established.

With the topic tracking method and apparatus of the invention, message topic tracking in the web-based interactive messaging environment can be performed dynamically, automatically and in real time.

In the following discussion, a great amount of concrete details are provided to help thoroughly understand the preferred embodiment of the present invention. However, it is apparent to those of ordinary skill in the art that some of the concrete details may be omitted from a different embodiment of the present invention. In addition, it should be further appreciated that many specific terms used below are only for the convenience of description, and thus the present invention should not be limited to only use in any specific applications represented and/or implied by such terms.

As used here, the term "interactive messaging environment" refers to a web-based information sharing, broadcasting and acquiring platform. In the interactive messaging environment, the users interact with each other through issuing messages or making remarks on the isssused messages.

An example of the interactive messaging environment is microblog. The embodiments of the invention will be described in detail below by taking the interactive messaging environment of microblog as an example. However, it should be appreciated that, the following embodiments are provided only for the purpose of illustration and not intended to limit the invention to the microblog. The invention completely can be applied to other types of interactive messaging environments rather than microblog, particularly an interactive messaging environment where the length of message is limited.

The interactive messaging environment contains a plurality of messages. The "message" in the disclosure generally refers to any information issued in the interactive messaging environment, through which users may interact with each other, for example, a message in microblog. As used here, the term "context message" generally refers to any information having a correlation with a selected message in the interactive messaging environment, for example, a replying message or forwarding message with respect to a microblog message in the microblog. The "topic group" in the disclosure refers to a group of messages having matched topic keywords.

Figure 1:
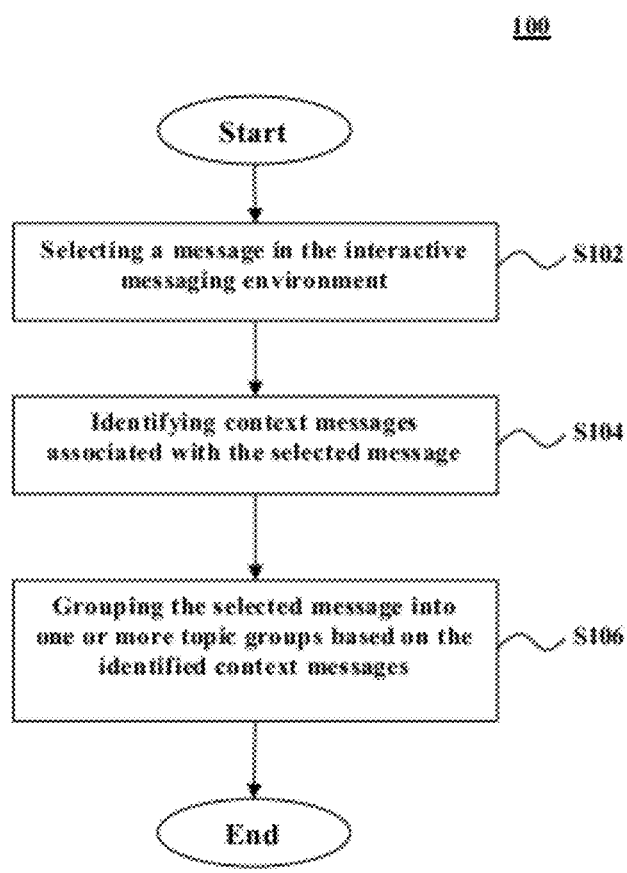
FIG. 1 is a flow chart illustrating a topic tracking method in an interactive messaging environment according to an embodiment of the invention.

FIG. 1 is a flow chart illustrating a topic tracking method 100 according to an embodiment of the invention. As shown in the figure, the topic tracking method 100 starts from a step S102 where a message is selected from a plurality of messages contained in the interactive messaging environment to which the method is applied. The selected message is, for example one or more microblog message issued by the microblogger. The step S102 may be initiated in response to a topic tracking request of a user, or may be automatically executed according to the setting of the interactive messaging environment.

It should be noted that, the message selected in the step S102 may be all the messages in the applied interactive messaging environment, or messages issued during a selected period of time, or messages aimed at a certain topicfield.

As described above, since the microblog limits the length of message, a microblogger will issue a plurality of messages in succession during a period of time, with respect to the same topic. For example, for a fan who is interested in a microblog recently, in order to comprehensively learn the microblog, he may sort all the microblog messages in the microblog according to topics. However, for a user who has already been interested in a topic and wishes to grasp latest trends thereof, he can select a period of time and perform topic tracking on the microblog messages issued in the selected period of time. In addition, in the case that the microblog provides classification identifications of topic fields, the user may also define microblog messages in the interested topic field to be tracked.

Next, in a step S104, context messages associated with the message selected in the step S102 are identified from the plurality of messages contained in the interactive messaging environment. As described in detail below in combination with FIG. 2 and FIG. 4, the context messages identified in the step S104 may be messages having replying or forwarding relations with the selected message, or may be messages corresponding to particular interactive operation users.

Then, the topic tracking method 100 advances to a step S106 where the message selected in the step S102 is grouped into topic group(s) based on the context messages identified in the step S104. It should be noted that it is possible that a message relates to two or more topics, then the message will be grouped into two or more corresponding topic groups.

In some embodiments of the invention, the step S106 can be performed as follows: extracting one or more context topic keywords from the identified context messages; generating one or more topic keywords by processing the extracted context topic keywords; and grouping the selected message into one or more topic groups corresponding to the generated one or more topic keywords respectively.

Corresponding to the context messages identified in the step S104, the extracted context topic keywords may be processed differently. As described in detail below with reference to FIGS. 2 and 4, topic keywords may be generated by combining the extracted context topic keywords and the kernel topic keywords extracted from the selected message per se; or the topic keywords may be generated by using a correspondence relation between the extracted context topic keywords and the interactive operation users.

How to realize topic grouping of the selected message by combining and using the context messages is described by way of example below, with reference to FIG. 2 and FIG. 4. The embodiment given in FIG. 2 identifies the context messages on the basis of the selected message. The embodiment in FIG. 4 identifies the context messages on the basis of the interactive operation user.

Figure 2:
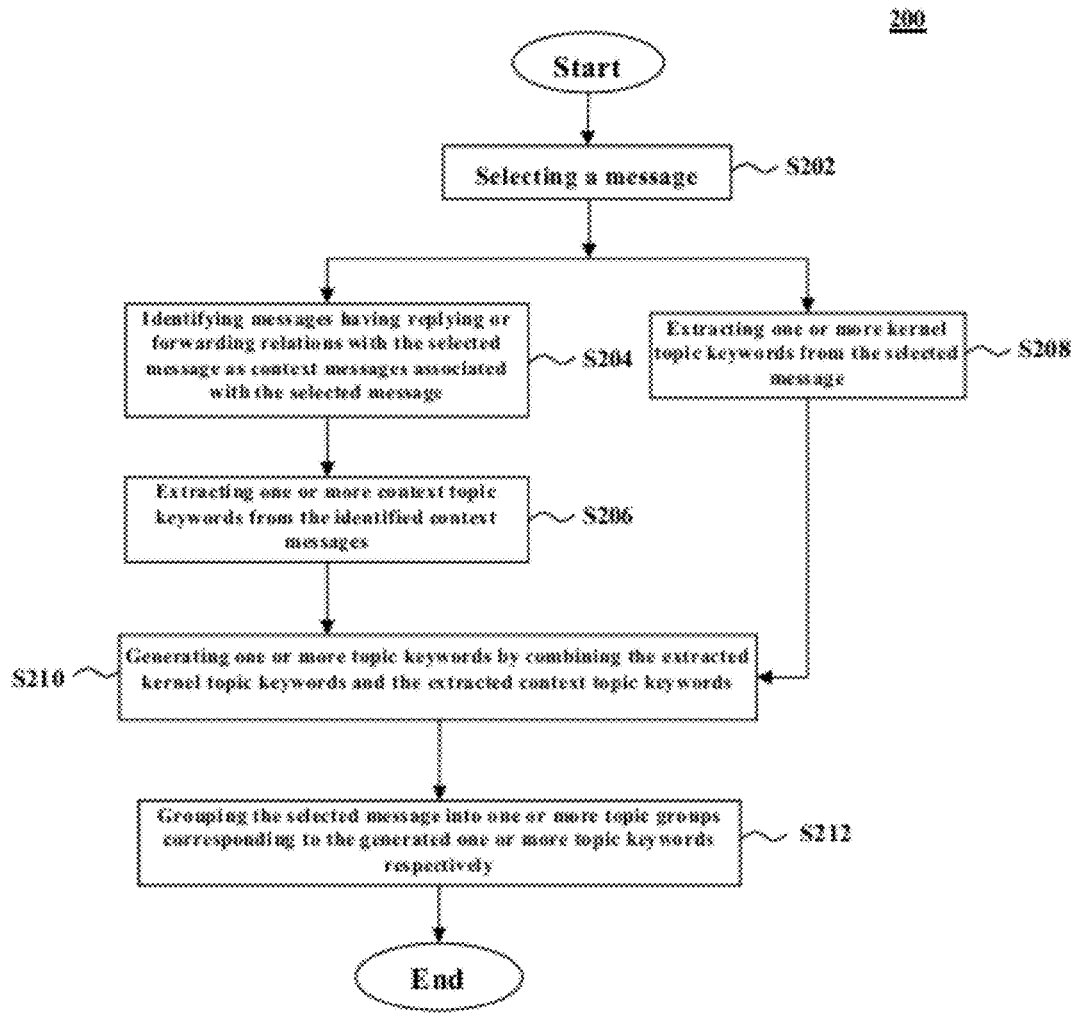
FIG. 2 is a flow chart illustrating a topic tracking process in an interactive messaging environment according to an embodiment of the invention.

The topic tracking process 200 according to an embodiment of the invention shown in FIG. 2 starts from a step S202. Similar to the step S102 in FIG. 1, in the step S202, a message to be analyzed is selected. Next in a step S204, messages having replying or forwarding relations with the message selected in the step S202 are identified as context messages associated with the selected message. For example, in case that the selected message is a microblog message, the identified context messages here can be replying messages and/or forwarding messages with respect to the microblog message.

However, it should be noted that, the correlation between the context messages and the selected message in the invention not only includes direct replying or forwarding of the context message with respect to the selected message, but also includes other replying or forwarding relations, for example, the selected message may be a message replying to or forwarding the context message, the context messages may be other messages replying to or forwarding messages with respect to which the selected message replys or forwards, and so on. For example, the selected message may be the replying or forwarding message per se, but the context message may be an original message with respect to which the replying or forwarding message is directed or other replying or forwarding messages of the original message.

Figure 3:
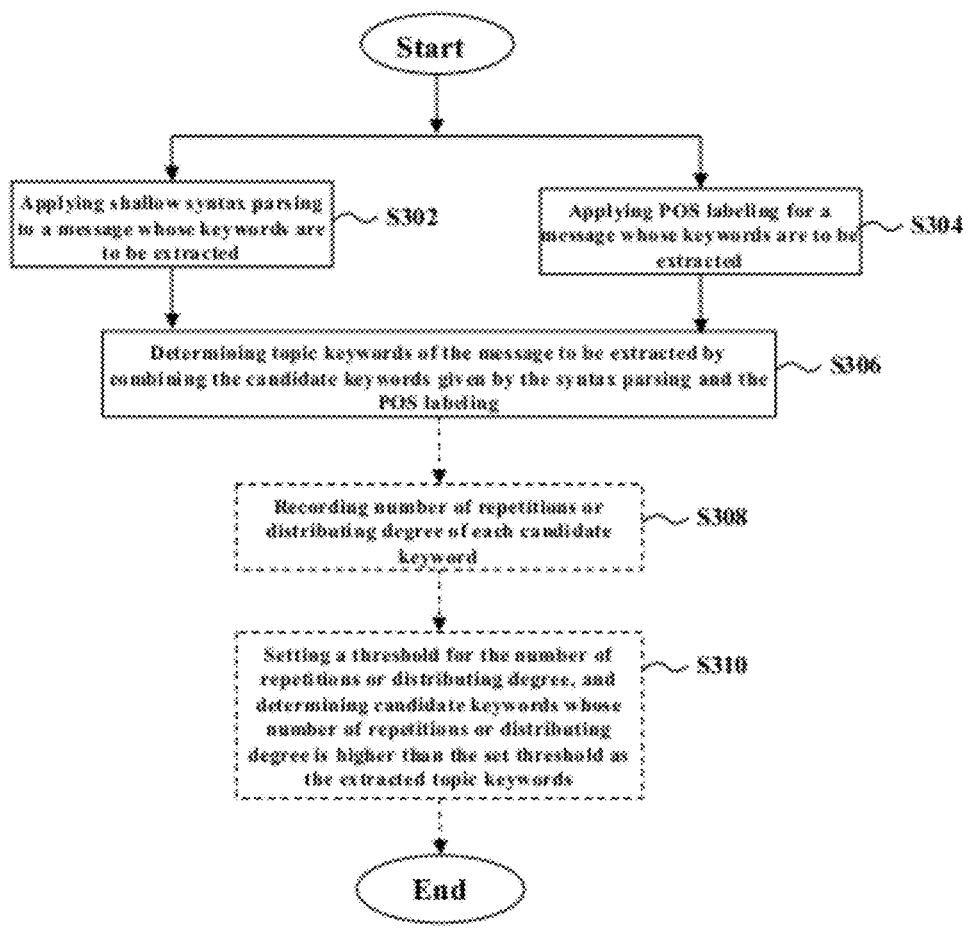
FIG. 3 is a flow chart illustrating a topic keyword extracting process according to an embodiment of the invention.

Next, in a step S206, one or more context topic keywords are extracted from the context messages identified in the step S204. Similarly, in a step S208, one or more kernel topic keywords are extracted from the message selected in the step S202. FIG. 3 illustrates a topic keyword extracting process 300 for a message whose keywords are to be extracted, according to an embodiment of the invention.

As for the message whose keywords are to be extracted, shallow parser may be used to extract words at key positions as candidate keywords, e.g., subject, predicate and/or object (step S302). Additionally or optionally, part of speech (POS) labeling may be used at the same time, for example, noun or verb words generally representing important meanings are extracted as candidate keywords (step S304). It should be noted that, the steps S302 and S304 may be performed by using syntax parser and POS labeling technologies that are already known in the art, are developing or will be developed future. Next in a step S306, topic keywords of the message to be extracted are determined by combining the candidate keywords given by the syntax parsing in the step S302 and the POS labeling in the step S304.

According to the embodiment of the invention, the message whose keywords are to be extracted involved in the topic keyword extracting process 300 in FIG. 3 may be the selected message or the context messages. It should be noted that, in some embodiments, for example, in case that there are a great number of replying messages or forwarding messages, context topic keywords of the context messages can be determined by further defining distributing degree or number of repetitions of the candidate keywords. For example, optionally, steps S308 and S310 may be added after the step S306. In a step S308, number of repetitions or distributing degree of each candidate keyword is recorded. Then in a step S310, a threshold for the number of repetitions or distributing degree is set, and candidate keywords whose number of repetitions or distributing degree is higher than the set threshold are determined as the extracted topic keywords.

Returning to FIG. 2, after extracting the kernel topic keywords of the selected message and the context topic keywords of the context messages, in a step S210, the extracted context topic keywords and the kernel topic keywords are combined to determine topic keywords associated with the selected message.

The keyword extraction and combination process is described in detail below by way of an example. For example, for a microblog message M: "warrior in the dark brings negative effects to children", there are in all 10 replying messages:

R1: "This cartoon damages eyesight of the children";
R2: "I am afraid of its influence on eyesight";
R3: 'Children learn many violent behaviors";
R4: "Poisoning children";
R5: "My husband said that it is rubbish";
R6: "This cartoon is really rubbish";
R7: "This cartoon has educating significance";
R8: "I also feel some negative effects to children";
R9: "Very large negative effects";
R10: "Boycott lousy rubbish cartoon".

First, syntax parsing and/or POS analysis is performed on the replying messages and the number of repetitions of the candidate keywords are determined, i.e., "children" four times; "cartoon" four times; "rubbish" three times; "eyesight" twice; "negative effects" twice; "violent" once; "behavior" once; "educating" once; "significance" once; "poison" once; "damage" once; "boycott" once.

If a threshold for the number of repetitions of the context topic keywords is set as 3, the keywords extracted from the above 10 reply messages are {"children", "cartoon", and "rubbish"}.

Next, by performing shallow syntax parser on the microblog message M, we obtain: subject: warrior in the dark; predicate: bring; object 1: children; object 2: negative effects. Only the subject and object are extracted therefrom, and we obtain a first group of candidate keywords of the microblog message as follows: {"warrior in the dark", "children", "negative effects"}.

Then, by making POS labeling on the microblog message M, we obtain: noun 1: warrior in the dark; noun 2: children; noun 3: negative effects; verb: bring; preposition: to. By extracting only nouns therefrom, we obtain a second group of candidate keywords of the microblog message as follows: {"warrior in the dark", "children", "negative effects"}.

We finally determine that the kernel topic keywords in the microblog message M are {"warrior in the dark", "children", "negative effects"}. By combining with the context topic keywords extracted from the replying messages, the finally constructed topic keywords may be {"warrior in the dark", "children", "negative effects", "rubbish", "cartoon"}.

We return to FIG. 2. After combining the extracted kernel keywords and the context keywords and generating the final topic keywords in the step S210, the flow advances to a step S212. In the step S212, a topic group to which the message belongs is determined based on the topic keywords generated in the step S210.

In the embodiment of FIG. 2, topic expansion is made on the basis of all the context messages with respect to a message. However, in actual applications, due to different personal language habits and very free and rich network languages, different followers have various kinds of descriptions with respect to the same thing. In this case, it is hard to determine context topic keywords of context messages of a certain message. However, language habits and styles of followed messages of the same follower generally have continuity and consistency.

In view of the above, topic tracking process 400 according to another embodiment of the invention will be described below with reference to FIG. 4. A kernel idea of the topic tracking process 400 is that, firstly analyzing topic keywords of replying messages or forwarding messages of the same follower to perform topic grouping on all the messages issued or the messages issued during a period of time by the same follower; then synthesizing respective message topic groupings of a plurality of followers to generate a general following message topic grouping; and finally, utilizing mapping relations between the following messages and the microblog message to realize topic grouping of the microblog message.

The topic tracking process 400 starts at a step S402 of selecting a message in the interactive messaging environment. The step S402 is identical with the step S102 in FIG. 1 and with the step S202 in FIG. 2, and thus the description thereof is omitted here.

Figure 5:
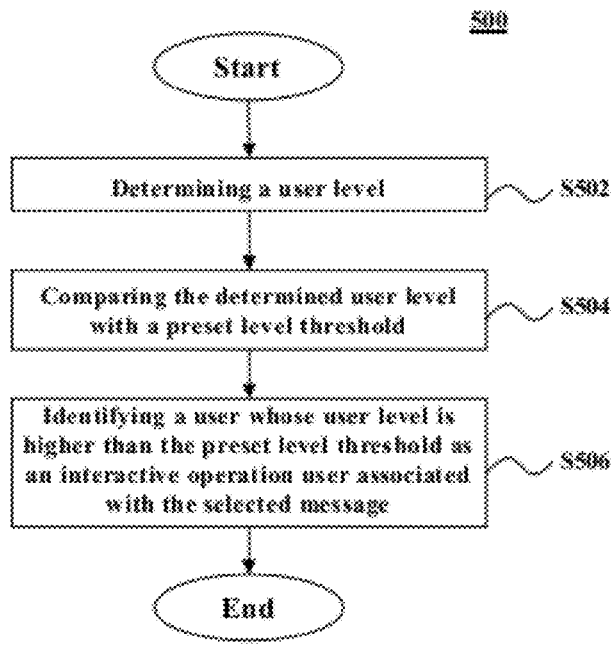
FIG. 5 is a flow chart illustrating a process of identifying interactive operation users according to an embodiment of the invention.
Figure 6:
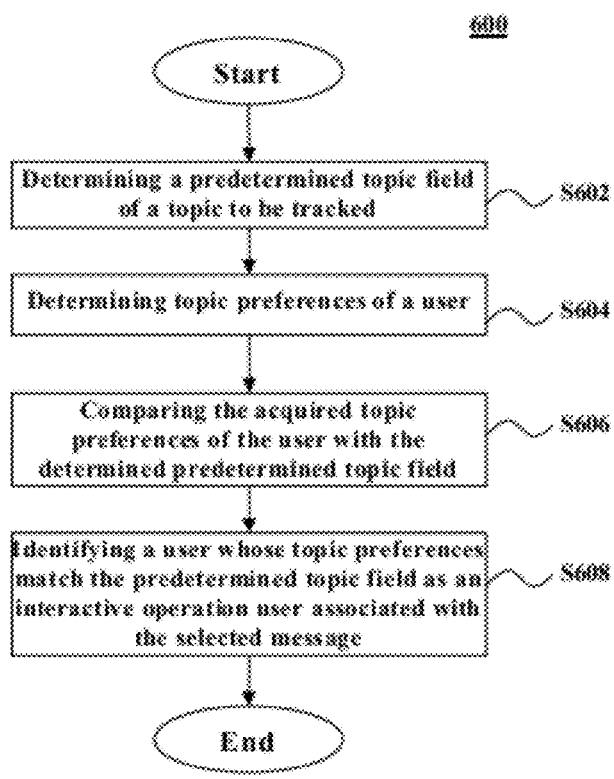
FIG. 6 is a flow chart illustrating a process of identifying interactive operation users according to another embodiment of the invention.

In step S404, one or more interactive operation users associated with the message selected in the step S402 are identified. FIG. 5 and FIG. 6 illustrate two different embodiments of identifying interactive operation users. The identifying process 500 in FIG. 5 is based on a level of the user, and the identifying process 600 in FIG. 6 is based on topic preferences of the user.

In the interactive operation user identifying process 500 of FIG. 5, a user level of an interactive operation user is determined first (step S502). For example, the users may be set as "junior level fans", "senior level fans", "principal level fans" and "president level fans", according to duration and degree of interest in a microblog. In general, fans with a higher level have a higher degree of interest in the microblog, and learn more related information, thus their remarks generally have valuable reference values. Therefore, in order to improve user identification's efficiency, only remarks of those fans whose levels are higher than a particular level are examined. In this regard, a level threshold for interactive operation users to be examined may be preset and a level of each user is compared with the preset level threshold (step S504). Thereafter, only a user whose level is higher than the preset level threshold is identified as interactive operation user to be further examined (step S506).

FIG. 6 illustrates an interactive operation user identifying process 600 according to another embodiment of the invention. In some embodiments, an identity of the user may be set or topic preferences of the user may be recorded. For example, for a user as a hiker, topic field he is more interested in (e.g., replying to or forwarding) may be travel; whereas for a user as a ball game player, topics on sports are more interested in. By analyzing the user's interactive operations in a predetermined period of time, the interactive system can determine and record topic preferences of each user. Of course, in other embodiments, the microblogger may set topic preferences of important users.

Then, in an interactive messaging environment set with topic preferences, one can firstly determine a predetermined topic field of a topic to be tracked (step S602). Then, in a step S604, topic preferences of an interactive operation user are acquired. Then, the acquired topic preferences of the interactive operation user are compared with the predetermined topic field determined in the step S602 (step S606). If the topic preferences of the user match the predetermined topic field, the user is identified as an interactive operation user to be further examined (step S608).

We return to FIG. 4. After identifying interactive operation users in the step S404, steps S406 and S408 are performed on each of the identified interactive operation users. In the step S406, message having replying or forwarding relations with the message selected in the step S402 are identified from the messages issued by the identified interactive operation users in the interactive messaging environment, as context messages associated with the selected message, e.g., replying messages and/or forwarding messages issued by the users during a period of time with respect to the selected message. Next in the step S408, one or more context topic keywords are extracted from the identified context messages, for the interactive operation user. Here, the keyword extracting process 300 in FIG. 3 can be applied too.

Steps S406 and S408 are executed repeatedly for all the interactive operation users identified in the step S404, until context topic keywords are extracted from the context messages corresponding to all the interactive operation users respectively (step S410).

Next in a step S412, context topic keywords corresponding to the identified interactive operation users are combined to generate general topic keywords. Finally, in a step S414, the selected message is grouped into one or more topic groups corresponding to the topic keywords generated in the step S412 respectively.

Figure 4:
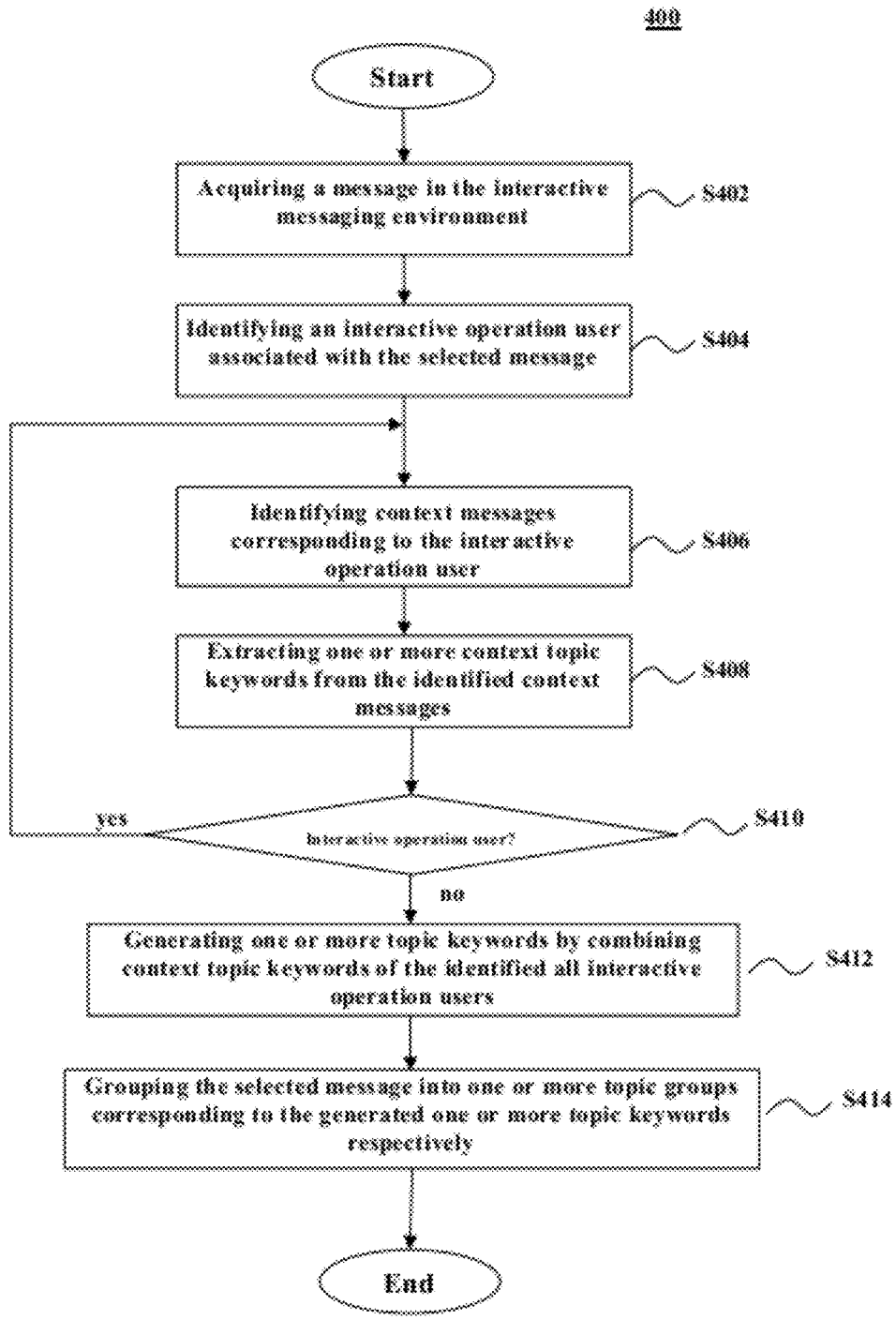
FIG. 4 is a flow chart illustrating a topic tracking process in an interactive messaging environment according to another embodiment of the invention.

The embodiments in FIG. 2 and in FIG. 4 identify the context messages on the basis of the selected message, and on the basis of the interactive operation users, respectively. According to an embodiment of the invention, the topic tracking processes of the two embodiments can be combined to further improve accuracy of topic tracking. For example, in the embodiment illustrated in FIG. 7, by combining and analyzing message grouping results obtained by the topic tracking processes of FIG. 2 and FIG. 4, a final grouping result is generated.

Figure 7:
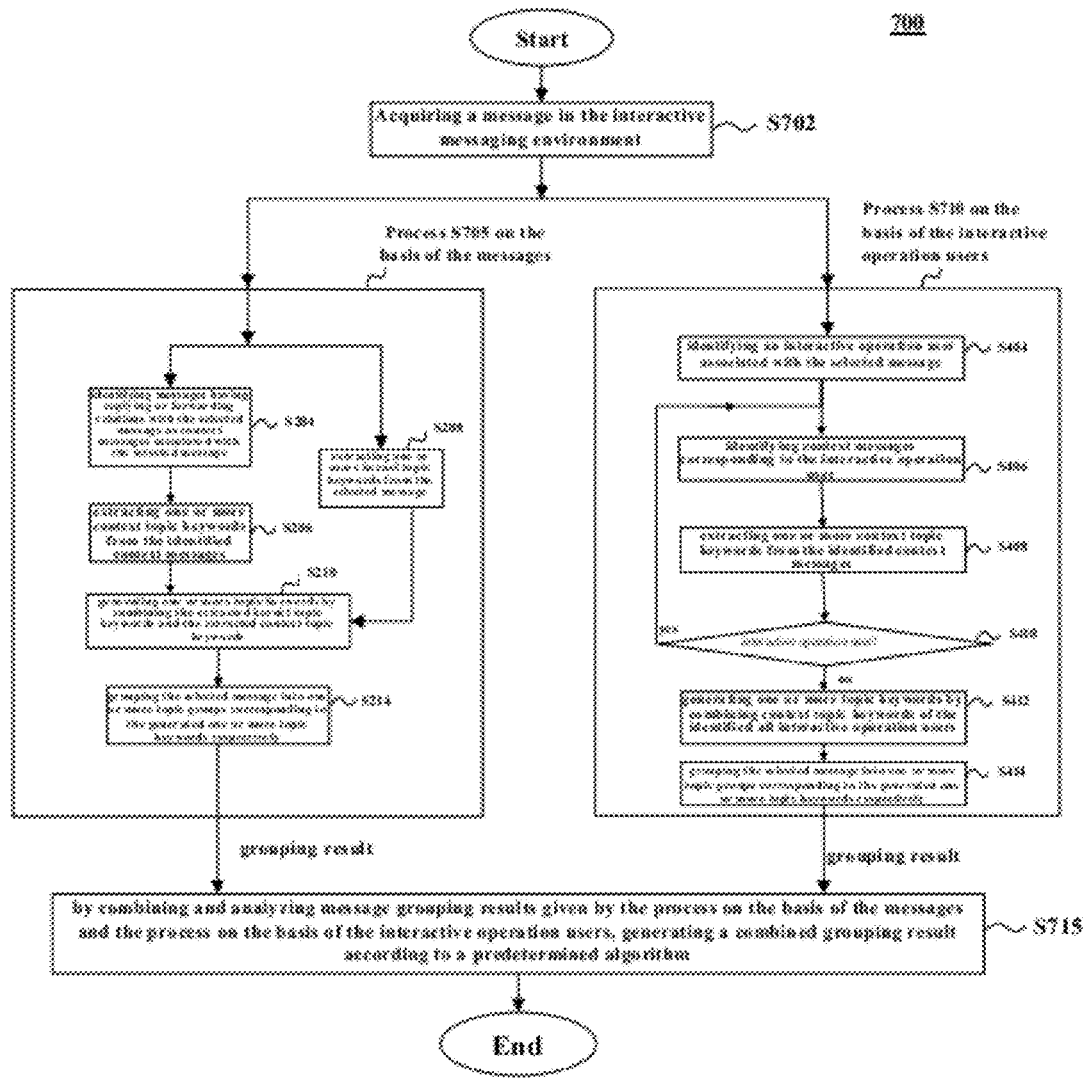
FIG. 7 is a flow chart illustrating a topic tracking process in an interactive messaging environment according to another embodiment of the invention.

As shown in FIG. 7, after a message to be analyzed is selected in a step S702, a process S705 on the basis of the messages and a process S710 on the basis of the interactive operation users are performed both. Here, the process S705 on the basis of the messages and the process S710 on the basis of the interactive operation users correspond to the topic tracking processes 200 and 400 in FIG. 2 and FIG. 4 respectively, and thus details thereof are omitted here. In a step S715, by combining and analyzing message grouping results given by the process S705 on the basis of the messages and the process S710 on the basis of the interactive operation users, a combined grouping result is generated according to a predetermined algorithm.

The various embodiments of the method of tracking message topics in an interactive messaging environment are described above in combination with the accompanying drawings. According to a single general inventive concept, the present invention further provides an apparatus for tracking message topics in an interactive messaging environment.

Figure 8:
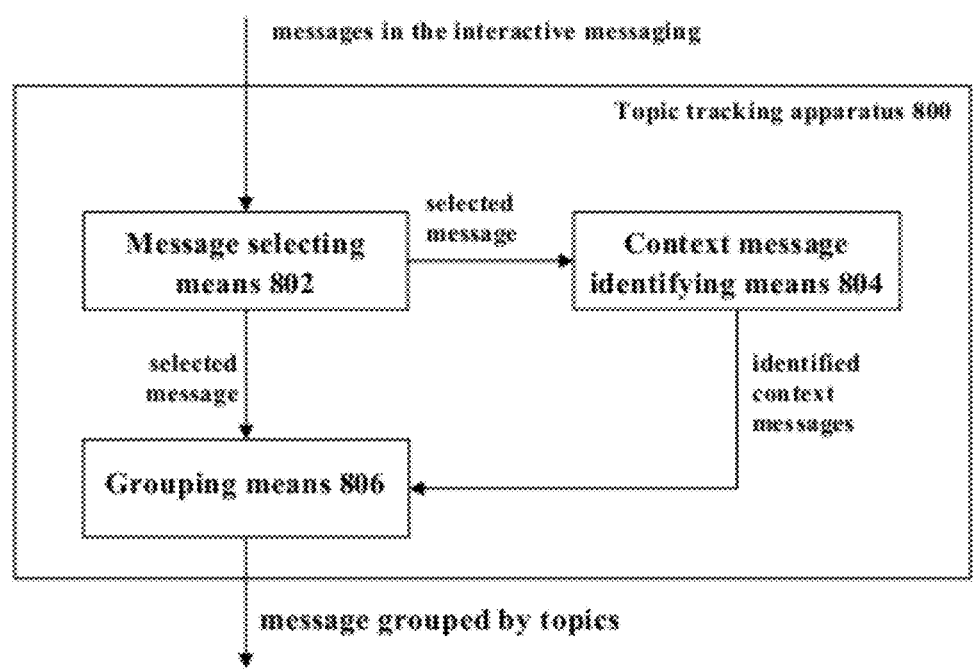
FIG. 8 is a block diagram illustrating a topic tracking apparatus in an interactive messaging environment according to an embodiment of the invention.

FIG. 8 illustrates a topic tracking apparatus 800 in an interactive messaging environment containing a plurality of messages according to an embodiment of the invention. As shown in FIG. 8, the topic tracking apparatus 800 includes message selecting means 802, context message identifying means 804 and grouping means 806.

The message selecting means 802 is configured to select a message in the interactive messaging environment. The context message identifying means 804 is configured to identify context messages associated with the message selected by the message selecting means 802, from the plurality of messages contained in the interactive messaging environment. The grouping means 806 is configured to group the message selected by the message selecting means 802 into one or more topic groups based on the context messages identified by the context message identifying means 804.

According to an embodiment of the invention, the grouping means includes: means configured to extract one or more context topic keywords from the identified context messages; means configured to generate one or more topic keywords by processing the extracted context topic keywords; and means configured to group the selected message into one or more topic groups corresponding to the generated one or more topic keywords respectively.

According to an embodiment of the invention, the context message identifying means includes: means configured to identify messages having replying or forwarding relations with the selected message as context message associated with the selected message.

According to an embodiment of the invention, the means configured to generate one or more topic keywords by processing the extracted context topic keywords includes: means configured to extract, from the selected message, one or more kernel topic keywords; and means configured to generate one or more topic keywords by combining the extracted kernel topic keywords and the extracted context topic keywords.

According to an embodiment of the invention, the context message identifying means includes: means configured to identify an interactive operation user associated with the selected message; and means configured to identify, from the messages corresponding to the interactive operation user, messages having replying or forwarding relations with the selected message, as context messages associated with the selected message.

According to an embodiment of the invention, the means configured to generate one or more topic keywords by processing the extracted context topic keywords includes: means configured to determine a correspondence relation between the extracted context topic keywords and the interactive operation user; and means configured to generate one or more topic keywords by using the determined correspondence relation.

According to an embodiment of the invention, the messages having replying or forwarding relations with the selected message include at least one of: messages replying to or forwarding the selected message; messages with respect to which the selected message replies or forwards; and messages replying to or forwarding the messages with respect to which the selected message replies or forwards.

According to an embodiment of the invention, the means configured to identify an interactive operation user associated with the selected message further includes: means configured to determine a user level; means configured to compare the determined user level with a preset level threshold; and means configured to identify a user whose user level is higher than the preset level threshold as an interactive operation user associated with the selected message.

According to an embodiment, the means configured to identify an interactive operation user associated with the selected message further includes: means configured to determine a predetermined topic field of a topic to be tracked; means configured to determine topic preferences of a user; means configured to compare the acquired topic preferences of the user with the determined predetermined topic field; and means configured to identify a user whose topic preferences match the predetermined topic field as an interactive operation user associated with the selected message.

According to an embodiment of the invention, the context message identifying means further includes: means configured to identify messages having replying or forwarding relations with the selected message as first context messages associated with the selected messages; and means configured to identify an interactive operation user associated with the selected message, and to identify from messages corresponding to the interactive operation user, messages having replying or forwarding relations with the selected message as second context messages associated with the selected message, and the grouping means further includes: means configured to extract, from the selected message, one or more first kernel topic keywords and to extract, from the identified first context messages, one or more first context topic keywords; means configured to generate one or more first topic keywords by combining the extracted first kernel topic keywords and the extracted first context topic keywords; means configured to obtain a first topic grouping result with respect to the selected message on the basis of the generated first topic keywords; means configured to extract one or more second context topic keywords from the identified second context messages by making reference to a correspondence relation between the identified second context messages and the interactive operation user; means configured to obtain a second topic grouping result with respect to the selected message on the basis of the extracted second context topic keywords, and means configured to generate a combined topic grouping result by combining and analyzing the first topic grouping result and the second topic grouping result.

It should be noted that, the topic tracking apparatus 800 as shown in FIG. 8 can also be incorporated into an interactive system server, or remotely communicate with the interactive system server. In case that interactive data in the interactive system server is available, the topic tracking apparatus 800 can also be incorporated into a proxy server of the interactive system.

Figure 9:
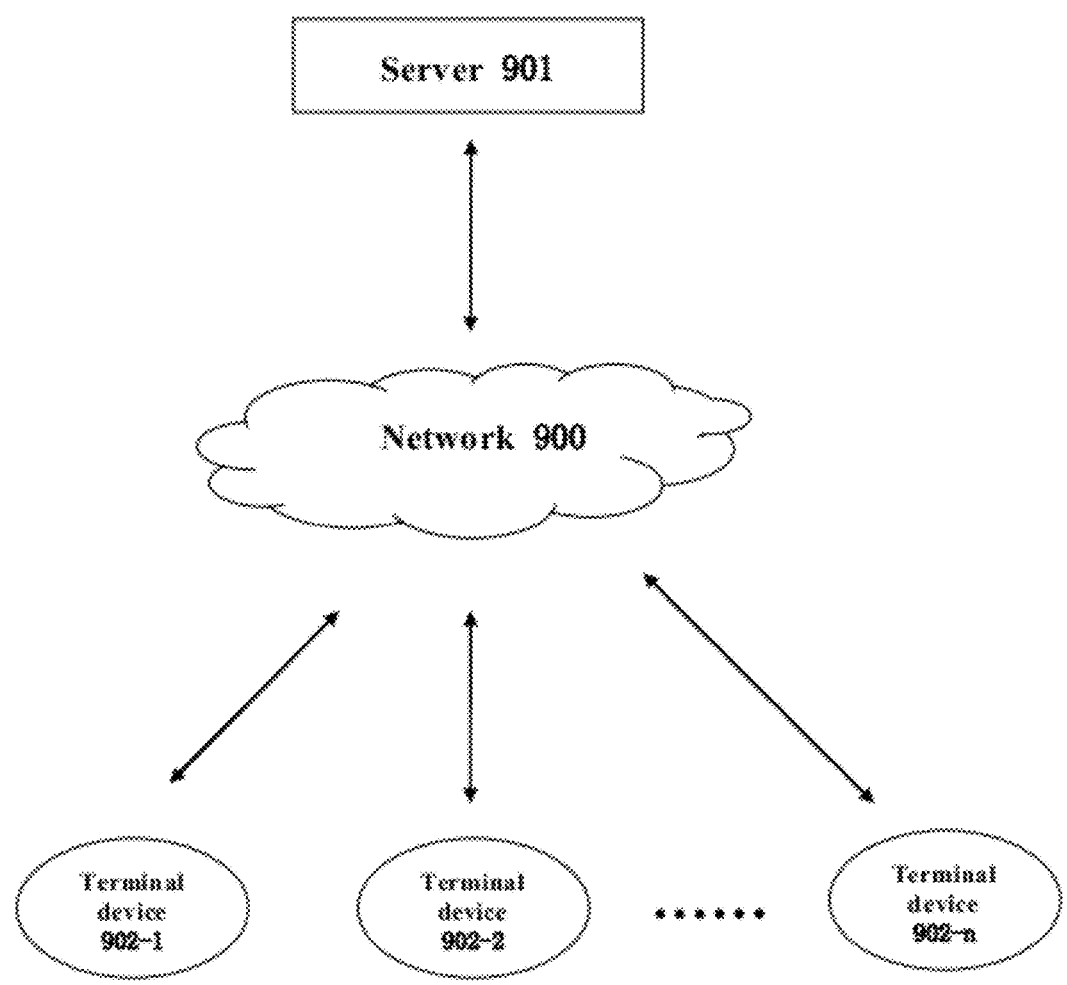
FIG. 9 is a schematic diagram showing an example of a web-based interactive messaging environment to which the invention can be applied.

FIG. 9 illustrates an example of a web-based interactive messaging environment where the invention can be applied. A plurality of terminal devices 902-1, 902-2 . . . 902-*n* are communicatively coupled to an interactive system server 901 via a network 900. The interactive system server 901 can perform the above-described various embodiments of the method of tracking message topics in an interactive messaging environment of the invention, e.g., the method 100 shown in FIG. 1. Various embodiments that can include or embody the above-described apparatus for tracking message topics in an interactive messaging environment of the invention, e.g., the apparatus 800 shown in FIG. 8, process messages from the plurality of terminal devices 902-1, 902-2 . . . 902-*n*. The network 900 can be Internet, Intranet, Local Area Network (LAN), and/or Megalopolis Area Network (MAN), or can be wireless or wired network. The terminal device 902 may include any type of computing device capable of being connected to the network 900, e.g., desktop computer, laptop computer, tablet computer, cellular phone or personal digital assistant.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in any tangible medium of expression having computer usable program code embodied therein.

Any combination of one or more computer usable or computer readable medium(s) may be utilized. The computer usable or computer readable medium may be, for example, but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission medium supporting for example the Internet or Intranet, or a magnetic storage device. Note that the computer usable or computer readable medium even may be paper or other suitable medium on which programs are printed, and this is because the programs can be obtained electronically by electrically scanning the paper or other medium, and then be compiled, interpreted or processed appropriately, and be stored in a computer memory if necessary. In the context of this document, a computer usable or computer readable storage medium may be any medium that contains, stores, communicates, propagates, or transmits a program for use by or in connection with an instruction execution system, apparatus, or device. A computer useable medium may include a data signal with computer usable program code embodied therein, propagated in baseband or as part of a carrier wave. The computer usable program code may be transmitted using any appropriate medium, including but not limited to wireless, wireline, optical fiber cable, RF, etc.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the computer or other programmable data processing apparatus, create means for implementing the functions/acts specified in the blocks of the flowchart illustrations and/or block diagrams.

These computer program instructions may also be stored in a computer readable medium that can direct a computer or other programmable data processing apparatus to function in a particular manner, such that the instructions stored in the computer readable medium produce an article of manufacture including instruction means which implement the functions/acts specified in the blocks of the flowchart illustrations and/or block diagrams.

The computer program instructions may also be loaded onto a computer or other programmable data processing apparatus to cause a series of operational steps to be performed on the computer or other programmable data processing apparatus to produce a computer implemented process such that the instructions which execute on the computer or other programmable apparatus provide processes for implementing the functions/acts specified in the blocks of the flowchart illustrations and/or block diagrams.

The flowchart illustrations and block diagrams in the figures illustrate the architecture, functionality, and operation of possible implementations of systems, methods and computer program products according to various embodiments of the present invention. In this regard, each block in the flowchart illustrations or block diagrams may represent a module, program segment, or portion of code, which includes one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms, "a", "an," and "the," are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims are intended to include any structure, material, or act for performing the function in combination with other claimed elements as specifically claimed. The description of a preferred embodiment of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable those of ordinary skill in the art to understand the invention for various embodiments with various modifications as are suited to the particular use contemplated.

What is claimed is:

1. A method for tracking message topics in an interactive messaging environment, wherein the interactive messaging environment contains a plurality of messages, the method comprising the steps of:
    selecting a message from the plurality of messages contained in the interactive messaging environment;
    determining a predetermined topic field of topics to be tracked;
    for each of a plurality of users:
        acquiring topic preferences of the user by analyzing interactive operations of the user in the interactive messaging environment;
        comparing the acquired topic preferences of the user with the determined predetermined topic field; and identifying the user as an interactive operation user associated with the selected message if the topic preferences of the user match the predetermined topic field:
identifying, from messages corresponding to each of one or more identified interactive operation users, messages having replying or forwarding relations with the selected message, as context messages associated with the selected message;
extracting one or more context topic keywords from the identified context messages;
generating one or more topic keywords by processing the extracted context topic keywords; and
grouping the selected message into one or more topic groups corresponding to the generated one or more topic keywords respectively,
wherein at least one of the steps is carried out by a computer device.

2. The method according to claim 1, wherein the generating step comprises:
extracting, from the selected message, one or more kernel topic keywords; and
generating one or more topic keywords by combining the extracted kernel topic keywords and the extracted context topic keywords.

3. The method according to claim 1, wherein the generating step comprises:
determining a correspondence relation between the extracted context topic keywords and each of the identified interactive operation users; and
generating one or more topic keywords by using the determined correspondence relation.

4. The method according to claim 1, wherein said messages having replying or forwarding relationship with the selected message comprise at least one of: messages replying to or forwarding the selected message; messages with respect to which the selected message replies or forwards; and messages replying to or forwarding the messages with respect to which the selected message replies or forwards.

5. The method according to claim 1, further comprising, for each of the plurality of users:
determining a user level of the user;
comparing the determined user level with a preset level threshold; and
if the user level of the user is higher than the preset level threshold, identifying the user as an interactive operation user associated with the selected message.

6. The method according to claim 1 wherein
the extracting, generating and grouping steps comprise:
extracting, from the selected message, one or more first kernel topic keywords, and extracting, from the identified first context messages, one or more first context topic keywords;
generating one or more first topic keywords by combining the extracted first kernel topic keywords and the extracted first context topic keywords;
obtaining a first topic grouping result with respect to the selected message on the basis of the generated first topic keywords;
extracting one or more second context topic keywords from the identified second context messages by making reference to a correspondence relation between the identified second context messages and each of the identified interactive operation users;
obtaining a second topic grouping result with respect to the selected message on the basis of the extracted second context topic keywords; and
generating a combined topic grouping result by combining and analyzing the first topic grouping result and the second topic grouping result.

7. An apparatus for tracking message topics in an interactive messaging environment, wherein the interactive messaging environment contains a plurality of messages, the apparatus comprising:
a processor;
a memory;
message selecting means configured to select a message from the plurality of messages contained in the interactive messaging environment;
context message identifying means configured to:
determine a predetermined topic field of topics to be tracked;
for each of a plurality of users:
acquire topic preferences of the user by analyzing interactive operations of the user in the interactive messaging environment;
compare the acquired topic preferences of the user with the determined predetermined topic field; and
identify the user as an interactive operation user associated with the selected message if the topic preferences of the user match the predetermined topic field; and
identify, from messages corresponding to each of one or more identified interactive operation users, messages having replying or forwarding relations with the selected message, as context messages associated with the message selected by the message selecting means; and
grouping means configured to:
extract one or more context topic keywords from the identified context messages;
generate one or more topic keywords by processing the extracted context topic keywords; and
group the selected message into one or more topic groups corresponding to the generated one or more topic keyword respectively.

8. The apparatus according to claim 7, wherein the grouping means are further configured to
extract, from the selected message, one or more kernel topic keywords; and
generate one or more topic keywords by combining the extracted kernel topic keywords and the extracted context topic keywords.

9. The apparatus according to claim 7, wherein the grouping means are configured to generate one or more topic keywords by:
determining a correspondence relation between the extracted context topic keywords and each of the identified interactive operation users; and
generating one or more topic keywords by using the determined correspondence relation.

10. The apparatus according to claim 7, wherein the messages having replying or forwarding relations with the selected message comprises at least one of:
messages replying to or forwarding the selected message; messages with respect to which the selected message replies or forwards; and messages replying to or forwarding the messages with respect to which the selected message replies or forwards.

11. The apparatus according to claim 7, wherein the context message identifying means are further configured to:
determine a user level of the user;
compare the determined user level with a preset level threshold; and identify the user as an interactive operation user associated with the selected message if the user level of the user is higher than the preset level threshold.

12. The apparatus according to claim 7, wherein,
the grouping means are configured to:
extract, from the selected message, one or more first kernel topic keywords and to extract, from the identified first context messages, one or more first context topic keywords;
generate one or more first topic keywords by combining the extracted first kernel topic keywords and the extracted first context topic keywords;
obtain a first topic grouping result with respect to the selected message on the basis of the generated first topic keywords;
extract one or more second context topic keywords from the identified second context messages by making reference to a correspondence relation between the identified second context messages and the interactive operation user;
obtain a second topic grouping result with respect to the selected message on the basis of the extracted second context topic keywords; and
generate a combined topic grouping result by combining and analyzing the first topic grouping result and the second topic grouping result.

* * * * *